United States Patent [19]

Boda

[11] Patent Number: 5,524,515

[45] Date of Patent: * Jun. 11, 1996

[54] SUPPORT PANEL FOR A ROTARY PAPER CUTTER

[75] Inventor: James C. Boda, Merrimac, Wis.

[73] Assignee: Fiskars Oy Ab, Helsinki, Finland

[*] Notice: The portion of the term of this patent subsequent to Jun. 21, 2011, has been disclaimed.

[21] Appl. No.: 262,308

[22] Filed: Jun. 20, 1994

Related U.S. Application Data

[63] Continuation-in-part of Ser. No. 68,399, May 28, 1993, Pat. No. 5,322,001.

[51] Int. Cl.⁶ .................................. B62D 1/18; B62D 7/02
[52] U.S. Cl. .................................. 83/455; 83/456; 83/485; 83/522.11; 83/564; 83/588; 83/614
[58] Field of Search .................. 83/455, 485, 614, 83/456, 489, 522.11, 578, 564, 588

[56] References Cited

U.S. PATENT DOCUMENTS

| | | | |
|---|---|---|---|
| 621,299 | 3/1899 | Empfield | 83/455 |
| 802,720 | 10/1905 | Weber | 83/485 X |
| 802,721 | 10/1905 | Weber | 83/485 X |
| 1,572,304 | 2/1926 | Morton | 83/455 |
| 2,672,933 | 3/1954 | Bridy | 83/578 |
| 3,301,117 | 1/1967 | Spaulding | 83/455 |
| 3,532,018 | 10/1970 | Szabo | 83/455 |
| 3,628,412 | 12/1971 | Rogers, Jr. | 83/455 |
| 3,779,119 | 12/1973 | Broides | 83/455 X |
| 3,805,652 | 4/1974 | LaLonde et al. | 83/614 |
| 3,821,915 | 7/1974 | Larrable | 83/455 X |
| 3,973,459 | 8/1976 | Stowe | 83/455 |
| 3,996,827 | 12/1976 | Logan | 83/455 |
| 4,224,854 | 9/1980 | Malacheski et al. | 83/455 X |
| 4,798,112 | 1/1989 | Kozyrski et al. | 83/614 X |
| 5,103,710 | 4/1992 | Ross | 83/485 |
| 5,322,001 | 6/1994 | Boda | 83/455 X |

*Primary Examiner*—Eugenia Jones
*Attorney, Agent, or Firm*—Foley & Lardner

[57] ABSTRACT

A paper cutter assembly having an extruded rail assembly including a base and a rail formed at right angles to each other. A carriage assembly is mounted on the rail for translational movement across the rail. End blocks are provided in each end of the rail assembly for pivotally connecting the rail assembly to guide blocks for pivotal movement between operative and inoperative positions with respect to the paper.

3 Claims, 5 Drawing Sheets

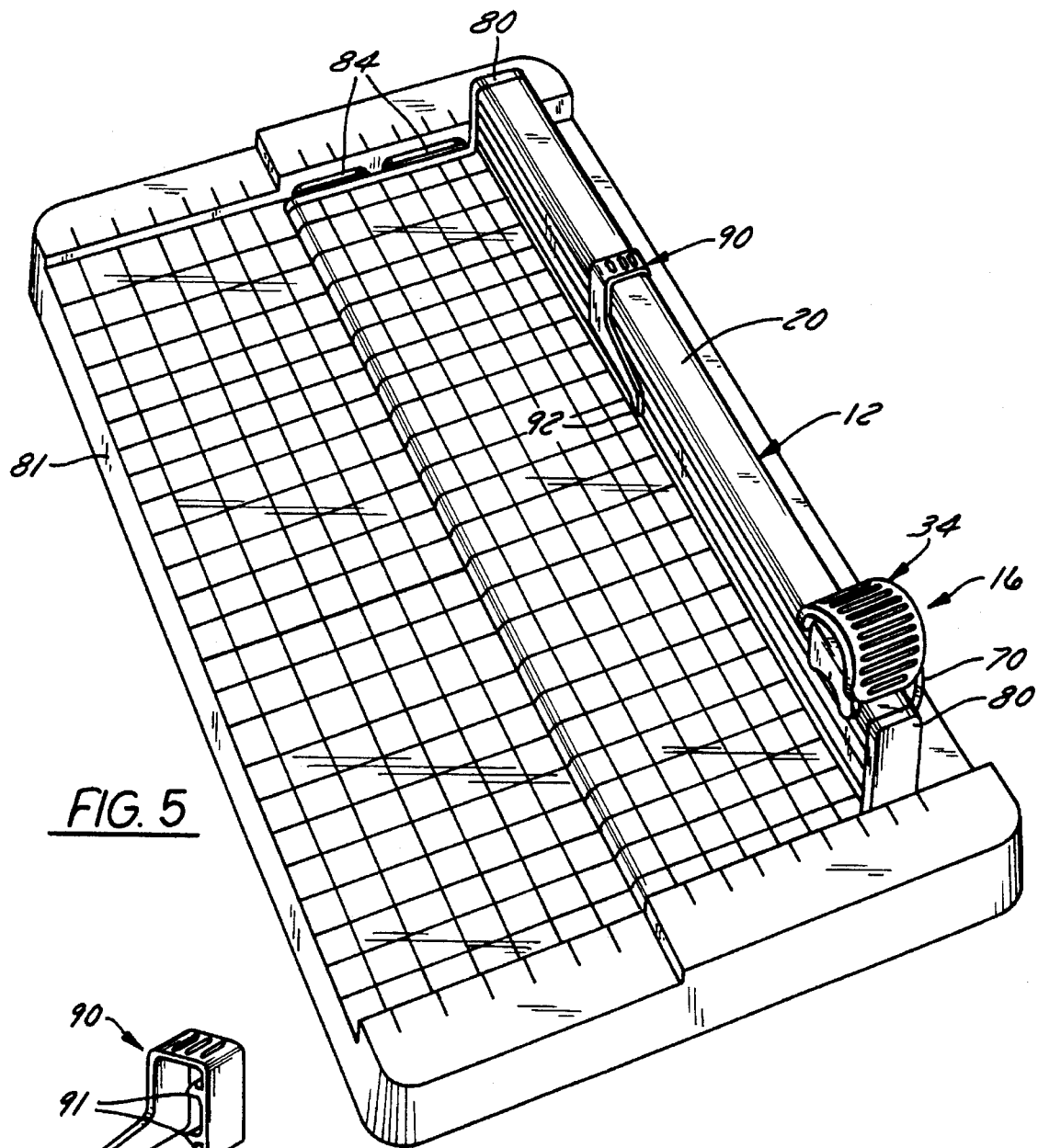
FIG. 5
FIG. 7
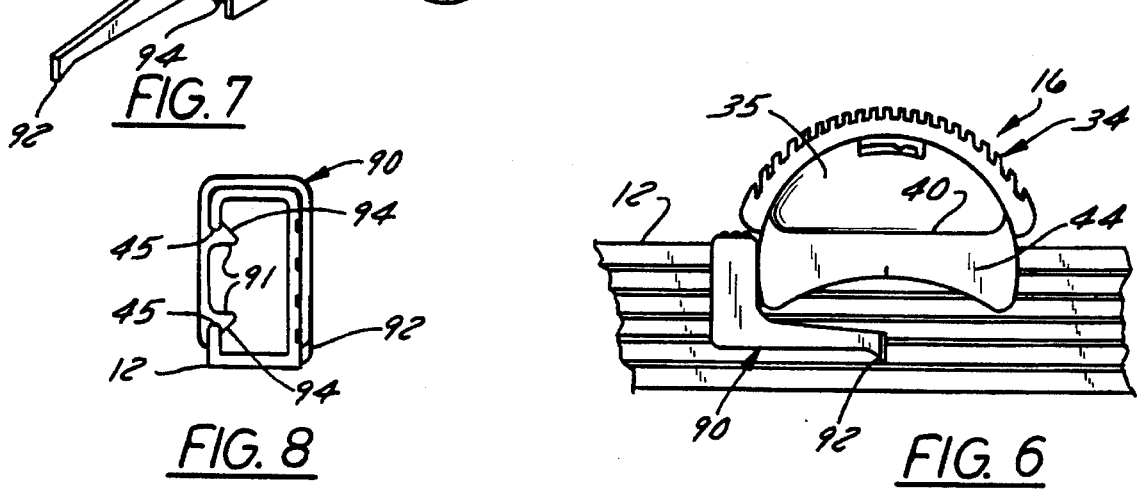
FIG. 8
FIG. 6

5,524,515

SUPPORT PANEL FOR A ROTARY PAPER CUTTER

RELATED APPLICATION

This application is a continuation-in-part of application Ser. No. 08/068,399, filed May 28, 1993, U.S. Pat. No. 5,322,001, issued on Jun. 21, 1994, for "Paper Cutter With Circular Blades."

FIELD OF THE INVENTION

This invention relates to paper cutting devices and more particularly to a reinforced rail for supporting a rotary cutting blade carriage assembly mounted for translational movement on the rail assembly.

BACKGROUND OF THE INVENTION

My earlier filed patent application Ser. No. 08/068,399, filed on May 28, 1993, was concerned with a carriage assembly which is mounted on a rail for translational movement across a cutting board to cut or trim various material. The rail is mounted for pivotal motion with respect to the cutting board to raise the carriage assembly above the paper sheets to allow for placement of the paper sheets to be cut. A circular blade is mounted in the carriage assembly for rotational motion of the circular blade as it passes over the paper sheets. The carriage assembly is biased to an inoperative position on the rail when not in use. The carriage assembly is pushed down to move the blade into engagement with the stack of paper and then moved across the rail to cut or trim the paper. A self healing pad may be provided beneath the carriage assembly and moved across the rail to cut or trim the paper. The rail assembly provides sufficient structural strength to maintain the carriage assembly in a straight line for up to twelve inches. However, the rail cannot maintain a straight line when cuts of longer length are required.

SUMMARY OF THE PRESENT INVENTION

The present invention is concerned with a reinforced rail assembly for a rotary cutter blade assembly which can be used to cut paper strips of a width or length greater than twelve inches. In this regard the reinforced rail assembly can be used independently to support a carriage assembly which can be placed on the top of a stack of paper to cut the full length of the rail assembly. A self healing pad may be placed beneath the stack of paper when cuts of greater depth than the exposed portion of the blade are to be made. The reinforced rail assembly can be adapted to be mounted for pivotal movement above a supporting surface to allow for the placement of a stack of paper to be cut.

One of the primary features of the invention is the ability to use the rail assembly independently of a cutting board.

Another feature of the invention is the provision for a carriage stop which is mounted on the rail assembly to indicate the length of cut being made in the paper.

Other principal features and advantages of the invention will become apparent to those skilled in the art upon review of the following drawings, the detailed description and the appended claims.

BRIEF DESCRIPTION OF THE DRAWINGS

FIG. 5 is a perspective view showing the rail assembly mounted for pivotable movement on a cutting board;

FIG. 6 is a partial view of the rail assembly with a pointer shown mounted on the rail assembly in alignment with the periphery of the cutting blade;

FIG. 7 is a perspective view of the arrow on the pointer;

FIG. 8 is a view taken on line 8—8 of FIG. 5 showing the mounting of the pointer on the rail assembly;

Figure 1:
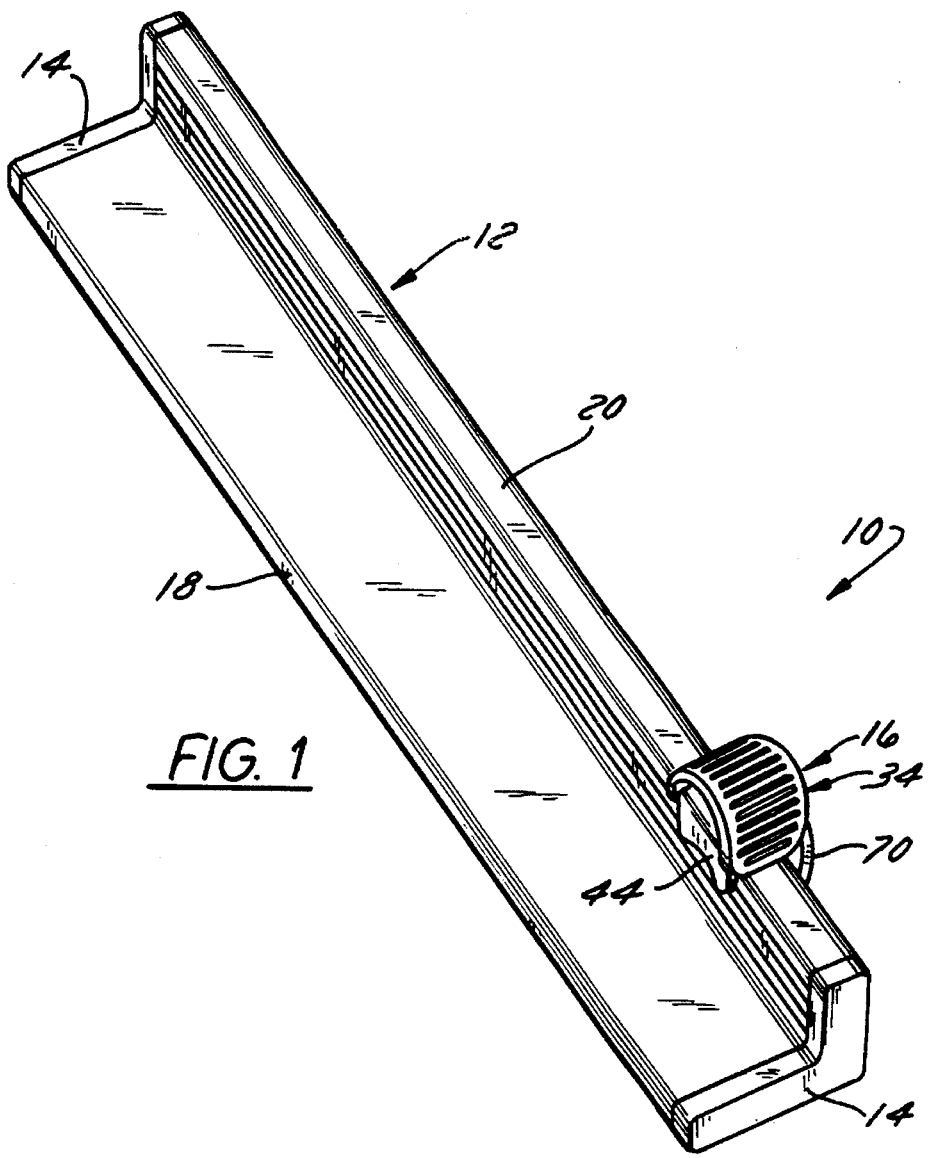
FIG. 1 is a perspective view of the rail assembly according to the present invention with a carriage assembly mounted on the rail assembly with a pair of end blocks mounted on the ends of the rail assembly.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 2:
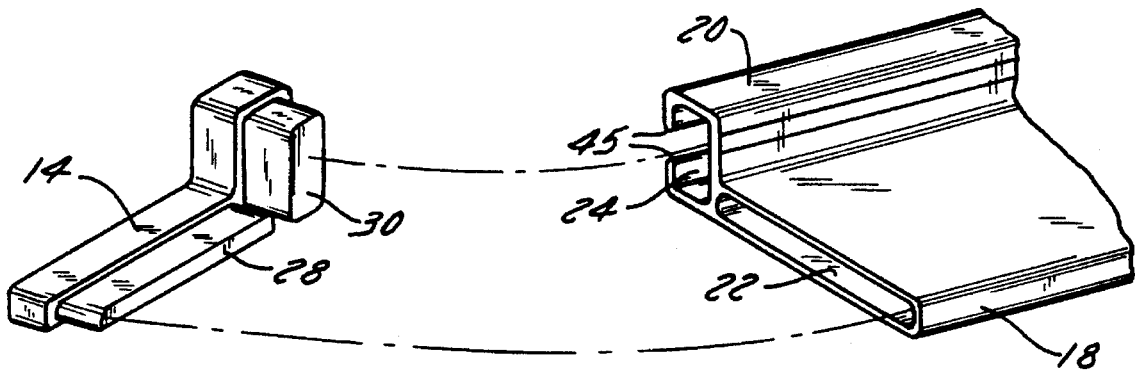
FIG. 2 is a perspective view showing the configuration of the end blocks mounted in each end of the rail assembly.

The paper cutter 10 according to the present invention as shown in FIGS. 1 and 2 generally includes a rail assembly 12 having an end block 14 mounted in each end. A carriage assembly 16 is shown mounted on the rail assembly 12 for translational movement across the rail assembly. In accordance with the present invention the rail assembly includes a unitary base 18 and rail 20 which are arranged at a right angle to each other. The rail assembly is in the form of a right angle extrusion which is provided with an opening 22 throughout its length. The angular relation of the rail 20 to the base 18 provides a rigid structure throughout its length which allows the rail assembly to be extended to a length of 24 inches or more. The ends of the rail assembly are closed by end blocks 14 having bosses 28 and 30 which matingly engage with the openings 22 and 24, respectively, at each end of the rail assembly.

The carriage assembly 16 as shown in FIGS. 9, 10, 11 and 12 includes a trolley 34 and a cover 36. An arcuate flange 38 is provided around the upper edge of a body 35 which terminates at a ledge 40. The flange 38 includes a series of slots 39 forming ribs 41 to provide a surface which can be easily grasped by the operator.

A flange 44 depends from the ledge 40 downward to form a space to accommodate the upper portion of rail 24. A pair of leaf springs 48 are mounted on a support member 42 below the flange 44 which extend outwardly and downwardly therefrom. The ends 50 of the springs 48 are in the form of pads which slide across the inside of the rail 20. The leaf springs 48 may be formed as an integral part of the support member of independent metallic springs mounted thereon. The front side of the body 35 includes a pin 52 essentially located in the face of the body 35 and surrounded by a circular support surface 54. A set of three L shaped flanges 46 are molded on the perimeter of the front of the body 35. The cover 36 is in the form of a semi circular housing 55 having a flange 58 around the outer perimeter. The number of tabs 60 corresponding to the number of flanges 46 on the trolley are located around the edge of the flange 58. A hub 62 having a blind bore 63 is provided in the center of the housing 55. A circular ridge 65 is formed around the hub 62 which forms a recess 71 between the ridge 65 and the ridge 58. On assembly the cover 36 is rotated far enough for the tabs 60 to clear the flanges 46. The pin 52 is aligned with the hole 63 in the trolley 34 and the cover rotated to interlock the tabs 60 with the flanges 46.

A rotary cutting blade 70 is mounted in the housing and includes a center opening 72. The blade 70 is mounted on the pin 52 in abutting engagement with support surface 54. When the cover 36 is mounted on the trolley 34 it should be noted that the recess 70 provided around the periphery of the ridge 65 accommodates the cutting blades 70.

Figure 10:
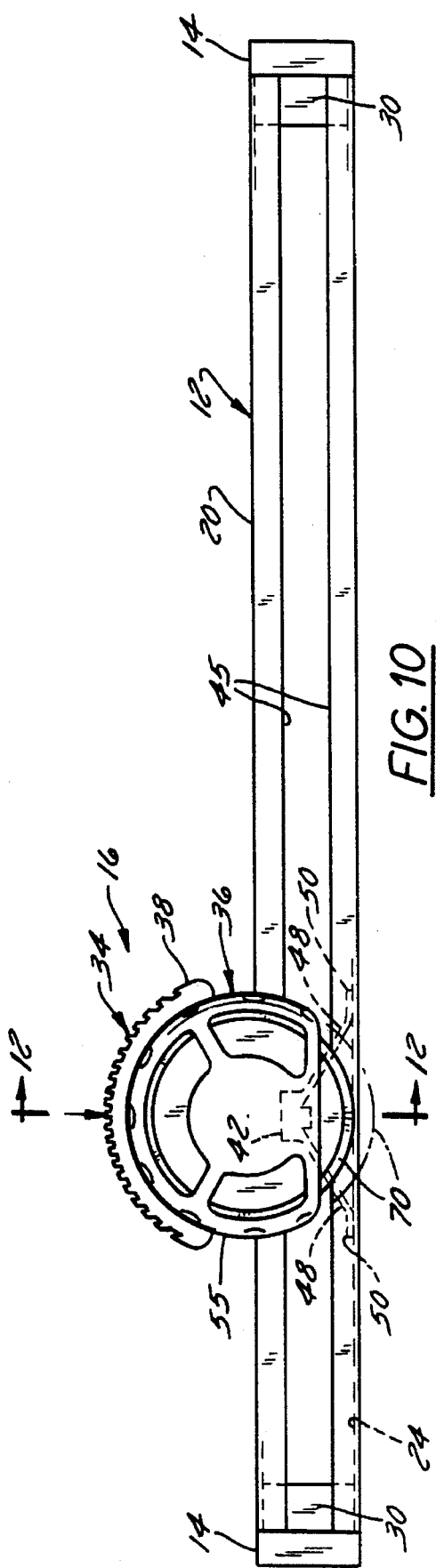
FIG. 10 is a front view of the carriage assembly shown mounted on the rail assembly.
Figure 11:
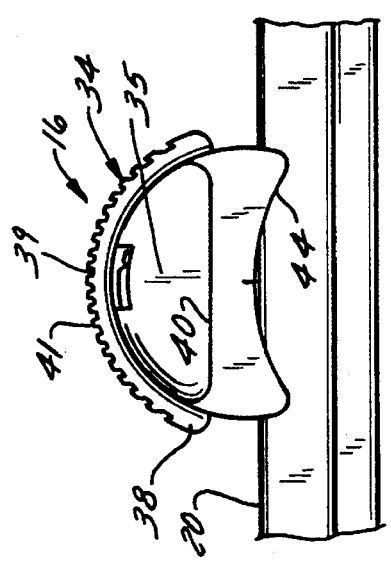
FIG. 11 is a back view of the carriage assembly mounted on the rail assembly.
Figure 12:
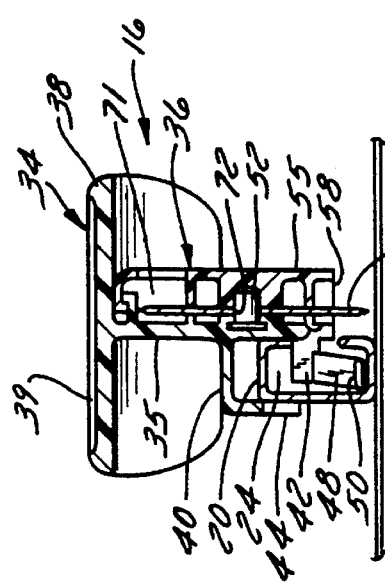
FIG. 12 is a cross sectional view taken on line 12—12 of FIG. 10.

The trolley 34 is mounted on the rail 20 by sliding the leaf springs 48 into the opening 24 in the rail with the flange 44 aligned with the outside of the rail 20. One of the cutting blades 70 is mounted on pin 52 and the cover 36 mounted on the trolley 34. In operation the paper sheets are aligned with the edge of the rail. The trolley 34 is pressed down on the paper as shown in FIG. 10 to engage and cut the edge of the paper. The trolley 34 is then pushed across the rail assembly 12. The blade 70 will roll across the paper trimming the edge of the paper sheet. When released the springs 48 will bias the trolley 34 upward to clear the blade from the paper.

Figure 3:
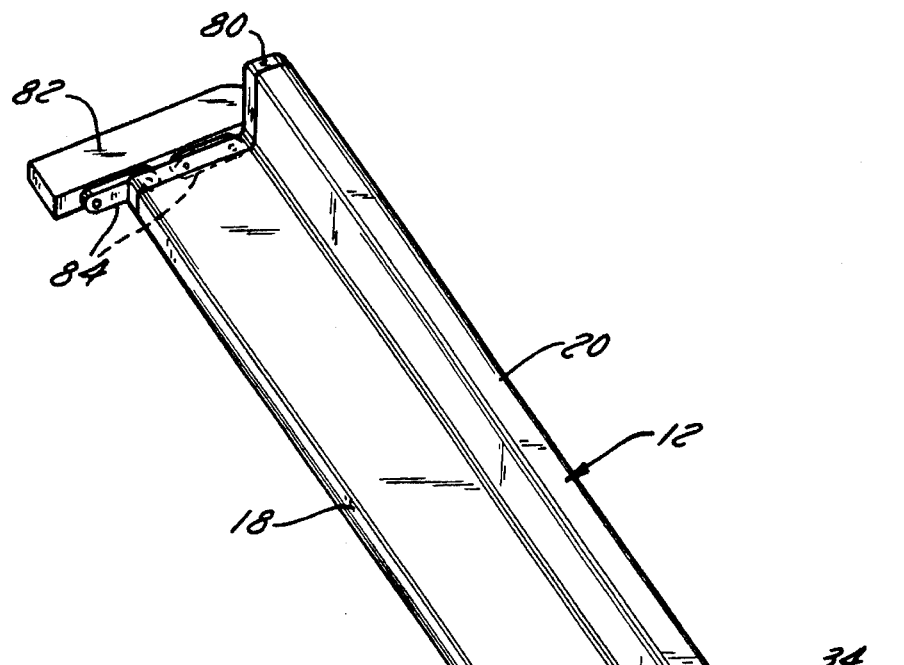
FIG. 3 is a perspective view of the rail assembly shown pivotally connected to a pair of support blocks.
Figure 3:
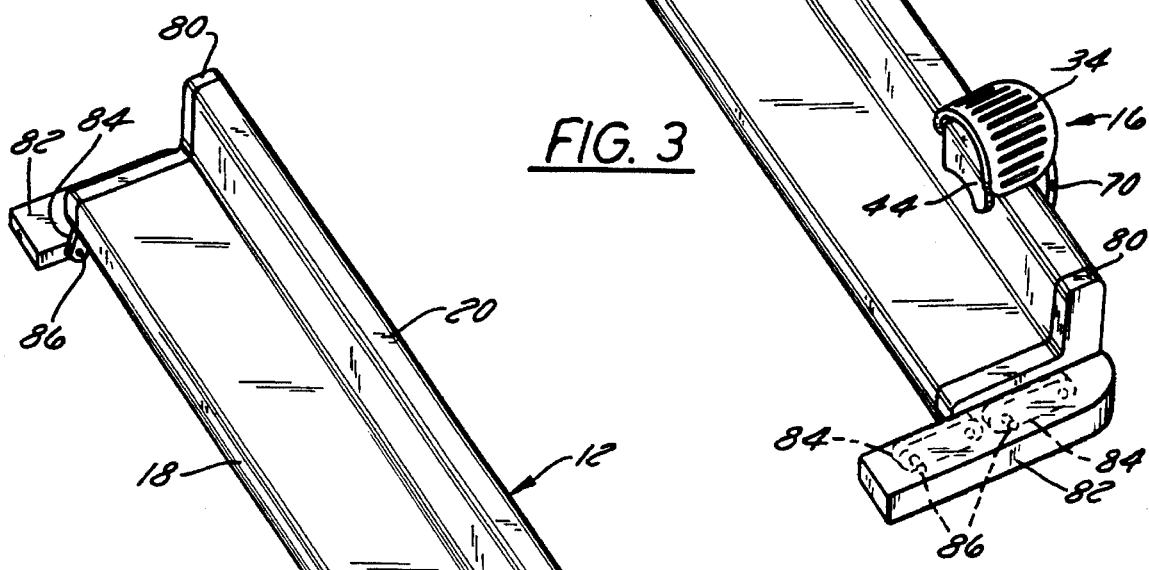
Figure 4:
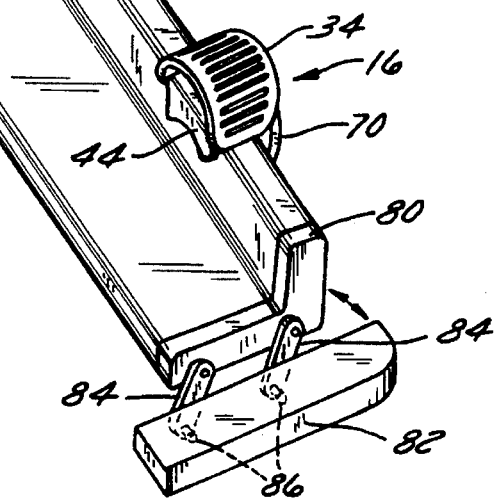
FIG. 4 is a view similar to FIG. 3 showing the rail assembly pivoted to the upper position.
Figure 9:
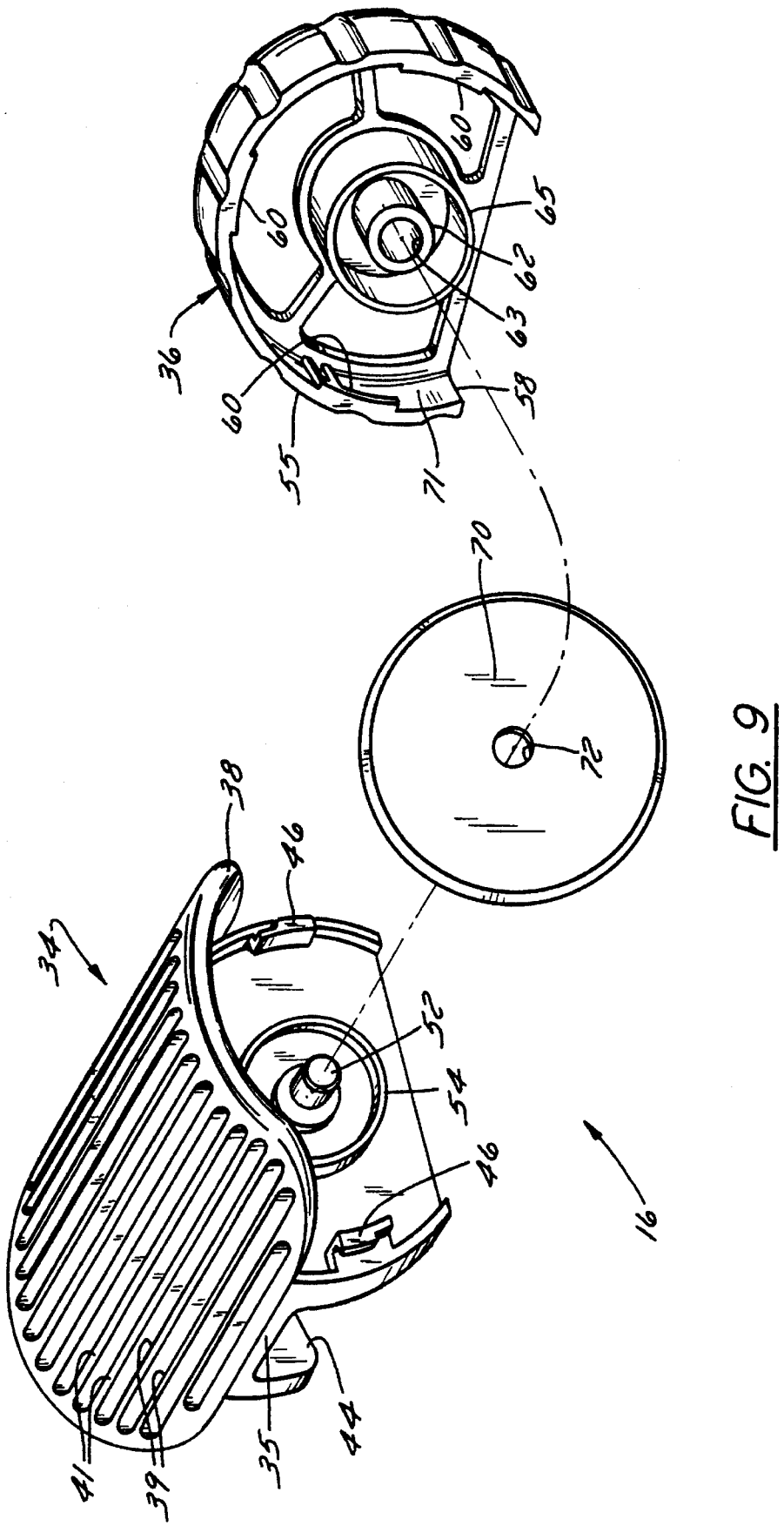
FIG. 9 is an exploded perspective view of the carriage assembly.

Referring to FIGS. 3 and 4 a second form of rail assembly 12 is shown having end blocks 80 mounted on each end of the rail assembly 38 which are pivotally connected to guide blocks 82 by means of pivot plates 84. Each pivot plate 84 has one end pivotally connected to the end block 80 and the other end connected to the guide block 82 by pins 86. With this arrangement the rail assembly can be pivoted to a horizontal position with the base located in a parallel relation to the paper while aligning paper sheets underneath the rail assembly. The rail assembly is then pivoted downward with the base seated on the paper sheets for cutting by the carriage assembly.

Referring to FIG. 5 the rail assembly 12 is shown mounted on a cutting board 81 by means of pivot plates 84 as described above. The rail assembly 12 can be pivoted to an upper position in order to align the paper with the edge of the cutting board 81 and then lowered into engagement with the paper. In this embodiment a mat may be provided in the cutting board 81 as disclosed in the prior application Ser. No. 08/068,399 to allow for the carriage assembly to be moved across the rail to cut the paper.

An alignment marker 90 as shown in FIGS. 7 and 8 is mounted on the rail assembly 12 to provide a stop in the cut being made in the paper. As shown in FIG. 6 the marker 90 includes an alignment arrow 92 which is located on a line drawn tangent to the edge of the blade and parallel to the rail to indicate the end of the cut being made by the blade. The marker 90 includes a pair of guide ledges 91 which form hooks 94 to engage the edges 44 of the slot in the rail. The marker can be aligned at any point on the rail to indicate the length of the cut to be made in the paper.

Thus, it should be apparent that there has been provided in accordance with the present invention a support panel for a rotary paper cutter that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A paper cutter assembly comprising a rail assembly including a base and a hollow rail, the base and rail are formed at a right angle to each other, means for pivotally mounting said rail assembly for movement between operative and inoperative positions with respect to a stack of paper, said means comprising first and second end blocks and first and second guide blocks, said first end block mounted on one end of the rail assembly and said second end block mounted on the other end of the rail assembly, said first guide block pivotally connected to said first end block and said second guide block pivotally connected to said second end block to maintain a parallel relation between the rail assembly and the stack of paper, and a carriage assembly mounted for translational movement across the rail, the carriage assembly including a rotary cutter blade and a pair of leaf springs formed on the carriage assembly and mounted in the rail for biasing said carriage assembly upward to a neutral position on the rail.

2. The assembly according to claim 1 wherein said means further includes a first pair of pivot plates pivotally connected to said first end block and said first guide block and a second pair of pivot plates pivotally connected to said second end block and said second guide block whereby said rail assembly can be elevated to align paper sheets under the rail assembly.

3. The assembly according to claim 1 including a marker slidably mounted on said rail and having an arrow on one side of the rail to indicate the end of the cut made by the blade.

* * * * *